INVENTOR.
GEORGE D. HUNTER
BY
Roger C. Johnson
ATTORNEY 3,098,531
CUSHION SPRING STANDARD FOR AN
EARTH WORKING TOOL
George D. Hunter, Des Moines, Iowa, assignor to Deere & Company, Moline, Ill., a corporation of Delaware
Filed Sept. 13, 1961, Ser. No. 137,836
9 Claims. (Cl. 172—710)

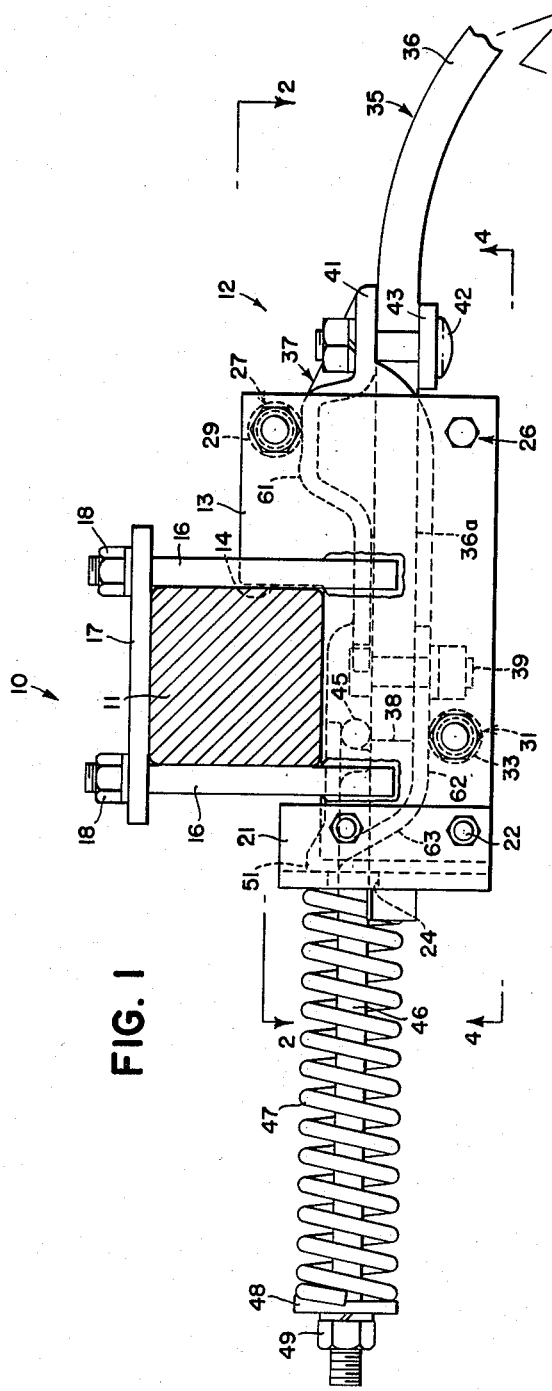
July 23, 1963 — G. D. HUNTER — 3,098,531
CUSHION SPRING STANDARD FOR AN EARTH WORKING TOOL
Filed Sept. 13, 1961 — 2 Sheets-Sheet 1
INVENTOR.
GEORGE D. HUNTER
BY
ATTORNEY July 23, 1963    G. D. HUNTER    3,098,531
CUSHION SPRING STANDARD FOR AN EARTH WORKING TOOL
Filed Sept. 13, 1961    2 Sheets-Sheet 2

The present invention relates generally to agricultural implements and more particularly to implements designed for mulch tillage, summer-fallowing, stubble-breaking, pasture renovation and the like.

The object and general nature of this invention is the provision of new and improved cushion-spring standard, wherein the soil working tools are connected to the supporting frame for a limited amount of vibratory action. More specifically, it is a feature of this invention to provide a tool mounting where the tool may shift generally directly rearwardly a limited amount and then will swing upwardly and rearwardly, as may be required to clear an obstruction or the like.

These and other objects and advantages of this invention will be apparent to those skilled in the art after a consideration of the detailed description of the preferred structural embodiment, taken in conjunction with the accompanying drawings in which said embodiment has been shown by way of illustration.

In the drawings:

FIG. 1 is a side view of a tool mounting in which the principles of this invention have been incorporated.

FIG. 2 is a sectional view taken generally along the line 2—2 of FIG. 1.

Figure 3:
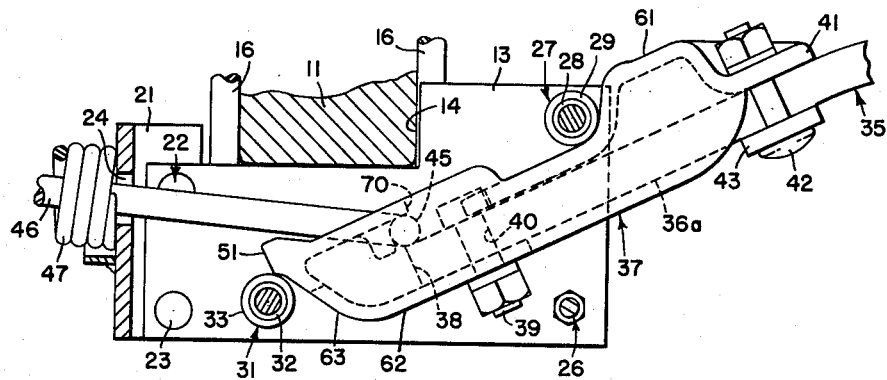
FIG. 3 is a sectional view taken along the line 3—3 of FIG. 2, showing the released position of the cushion spring standard.
Figure 4:
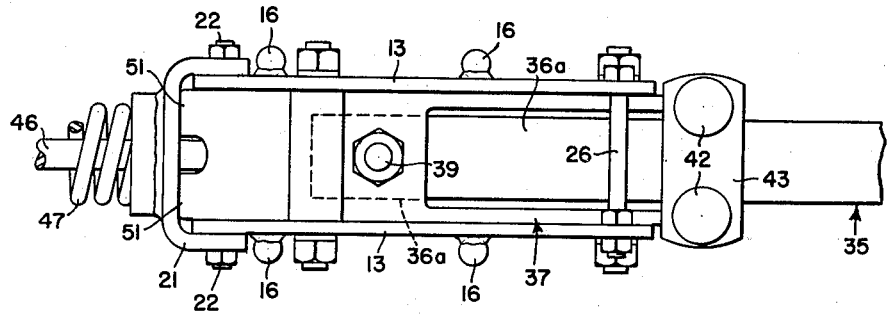
FIG. 4 is a sectional view taken along the line 4—4 of FIG. 1.

Referring first to FIG. 1, this invention is shown as incorporated in an agricultural implement sometimes referred to as a chisel point plow, in which a relatively heavy ground-penetrating member is connected to the frame of the implement by spring cushion means that yieldably holds the tool to its work, accommodates some relatively vibratory action, and permits some relative movement so that the tool may clear obstructions and the like.

The chisel point plow of this invention is indicated in its entirety by the reference numeral 10 and includes a mobile frame consisting principally of a transverse bar 11 generally square in cross section and arranged to receive a plurality of tool units 12, each securely fixed to the tool bar 11. Each tool unit 12 includes a pair of side plates 13 having cut out portions 14 and carrying spaced apart threaded members 16 disposed on opposite sides of the tool bar 11. Disposed over the upper threaded ends of the members 16 is a clamping plate 17, and when the nuts 18 on the members 16 are tightened the side plates 13 are securely fixed to the tool bar 11.

A generally U-shaped front end plate 21 is secured to the front end of the side plates 13 by means of bolts 22, the latter having countersunk heads 23 seated in suitable openings in the front portions of the side plates 13 whereby the end plate 21 secures the side plates 13 in spaced apart relation. The end plate 21 is apertured, as at 24, to receive a portion of associated springs means, as will be referred to below. The rear portions of the side plates 13 are fixed in spaced apart relation by a lower bolt and nut spacing means 26 and an upper spacing bolt and nut means 27 supports a suitable bushing 28 on which an upper roller 29 (FIG. 3) is journalled. Similar spacing bolt and nut means 31 is disposed at the lower forward portions of the side plates and an associated bushing 32 receives a forward lower roller 33.

The ground working tool is indicated by the reference numeral 35 and includes a curved spring member 36 to the lower end of which a suitable shovel or point member 30 (FIG. 1) is fixed. The forward portion of the spring member 36 forms a shank 36a that is adapted to be attached to the tool bar 11 by means that includes a hinge member 37, preferably in the form of a casting or the like. This member, as best shown in FIG. 3, is formed with an apertured socket section 38 in which the forward end of the tool shank 36a is disposed, the latter being apertured to receive bolt 39 that extends through the aperture 40 in the shank socket 38.

The rear portion of the hinge member 37 extends rearwardly beyond the rear edges of the side plates 13 and is provided with a flattened section 41 that is provided with a pair of apertures to receive bolt means 42 that extends downwardly at opposite sides of the shank 36a. The bolts 42 receive a clamping plate 43 so that when the bolts 42 are tightened the portion of the tool shank 36a rearward of the forward end is secured to the hinge member 37.

The forward portion of the member 37 is provided with an open slot 44 in which the head 45 of a T-bolt 46 is disposed. The bolt 46 extends forwardly through the center opening 24 of the end plate 21 and receives a compression spring 47. The forward end of the latter bears against a cap member 48 that is held on the bolt 46 by means of the nut 49. The forward portion of the hinge member 37 includes lugs 51 that, when the nut 48 is tightened, bear against the inner face of the end plate 21.

The hinge member 37 is of particular construction and is referred to as a hinge member because of its function in hingedly and shiftably connecting the tool 30 to the tool bar. The rear portion of the hinge member 37 includes an upper rear cam section 61 that is of appreciable fore and aft extent and underlies the rear upper roller 29. Similarly, the lower forward portion of the hinge member 37 is formed with a flat cam section 62 (FIG. 1) that overlies the lower forward roller 33. The forwardmost portion of the lower side of the hinge member 37 is formed as a curved cam-like section 63.

The action of the cushion spring standard as described above is substantially as follows:

Assuming that the implement is in normal operation, if the ground working chisel or point 30 should strike an obstruction, the spring 47 yields a certain extent and, as a result of such yielding, the hinge member 37 shifts directly rearwardly until the curved cam section 63 moves into a position over the lower forward roller 33. Further yielding of the spring 47 then permits the tool to move not only generally rearwardly but also the tool swings upwardly to a relatively sharp angle, as in FIG. 3, with the result that the obstruction is readily cleared, after which the spring 47 returns the hinge member 37 and the associated tool 35 to their usual operating position.

Small obstructions, extremely hard soil or the like may cause the spring 47 to yield to a certain extent, but in these cases the tool merely moves rearwardly a small amount but with no change in depth of operation unless the overload becomes excessive, in which case, as described above, the spring yields enough to permit the cam portion 63 to ride downwardly behind the roller 33, and this in turn permits the point 30 to raise upwardly.

The forward portion of the member 37 carries lugs 70 that cooperate with the head 45 of the T-bolt 46 to take the pull of the spring 47. The forward end of the tool shank 36a underlies the T-head 45 of the bolt 46 and so retains the latter in operative position, as will be seen from FIG. 1.

While I have shown and described above the preferred structure, in which the principles of this invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an agricultural implement, a transverse frame bar, an earth-working tool having a rear earth-penetrating portion and a forwardly extending horizontal shank portion, and tool mounting means comprising a first part, means fixedly clamping said first part to said frame bar, a second part separate from said tool and shiftable in a generally fore-and-aft direction relative to said first part, means fixing the shank of said earth-working tool to said second part so as to hold said tool out of contact with any portion of said first part, resilient means connected to act between said first and second parts for yieldably resisting movement of said second part and said tool relative to said first part, a first guide means carried by said first part and engageable with said second part to limit initial movement of the latter relative to said first part to linear movement in a generally rearward direction, and a second guide means carried by said first part in a position to engage said second part in position-determining relation, said second part being shaped so as to provide for swinging movement of said second part and said earth-working tool in a generally vertical direction with continued rearward movement of said second part.

2. In an agricultural implement, a transverse frame bar, an earth-working tool having a rear earth-penetrating portion and a forwardly extending horizontal shank portion, and tool mounting means comprising a first part, means fixedly clamping said first part to said frame bar, a second part shiftable in a generally fore-and-aft direction relative to said first part and also swingable in a generally vertical plane relative to said first part, spring means connecting said first and second parts to urge the latter part forwardly relative to said first part, means on said second part forming a socket section to receive said earth-working tool, means fixing said tool in said socket section, guide means comprising cam means carried by said first part and cooperating cam means on said second part engageable with the latter for holding said second part against swinging movement until said second part has moved rearwardly a predetermined amount relative to said first part, and means connecting the shank of said earth-working tool to said second part.

3. In an agricultural implement, a transverse frame bar, an earth-working tool having a rear earth-penetrating portion and a forwardly extending horizontal shank portion, and tool mounting means comprising a first part, means fixedly clamping said first part to said frame bar, a second part shiftable in a generally fore-and-aft direction relative to said first part, spring means pivotally connected with said second part to restrain generally horizontal movement of said second part relative to said first part, roller means on the rear portion of said first part and cooperating cam means on the rear portion of said second part to restrain upward movement of the rear end of said second part relative to said first part, and a second roller means on the forward portion of said first part and cam means on the forward portion of said second part for determining the amount of rearward and upward swinging of said second part and the ground working tool connected therewith.

4. In an agricultural implement, a transverse frame bar, an earth-working tool having a rear earth-penetrating portion and a forwardly extending horizontal shank portion, and tool mounting means comprising a pair of side plates, means fixing the latter to said bar, a hinge member fixed to the forward end of said shank portion, a first roller mounted between the rear portions of said plates above the rear portion of said hinge member, a second roller mounted between the forward portions of said side plates below the forward portion of said hinge member, the latter having cam sections normally disposed in a fore-and-aft direction forward of said first and second rollers, spring means acting between the forward portions of said side plates and the forward portion of said hinge member for holding said hinge member in a forwardmost position with said rollers adjacent the rear portions of said cam sections and for resisting rearward movement of said hinge member and said tool, one of said cam sections on said hinge member engaging said second roller for preventing upward tilting of said tool until said hinge member has moved a predetermined distance rearwardly relative to said second roller.

5. The invention set forth in claim 4 further characterized by said hinge member having an open end slot in its forward portion, and a T-bolt having its head disposed for pivotal movement in said slot and the other end receiving said spring means.

6. The invention set forth in claim 5 further characterized by an end plate fixed to said side plates forward of said hinge member and apertured to receive said T-bolt, and means on the forward end of said hinge member to engage said end plate for limiting the forward movement of said hinge member and tool under the influence of said spring means.

7. The invention set forth in claim 4 further characterized by said hinge member having an apertured socket to receive the forward end of said tool shank, said forward end of the shank being apertured, bolt means extending through the apertures in said shank and said apertured socket for fixing said shank to said hinge member, said hinge member having a rear portion disposed rearwardly of said side plates, and means clamping said last mentioned rear portion to the adjacent part of said tool shank.

8. The invention set forth in claim 4, further characterized by means acting between said hinge member and said side plates for controlling the amount of upward movement of the earth-working tool relative to the corresponding rearward movement of said tool when said hinge member and said tool moves rearwardly.

9. The invention set forth in claim 8, further characterized by said movement controlling means comprising a third cam section carried by said hinge member and engageable with said second roller.

References Cited in the file of this patent
UNITED STATES PATENTS
3,012,617    Anderson _____ Dec. 12, 1961